G. C. MATHERS.
Frame for Mosquito-Nets.
No. 197,483. Patented Nov. 27, 1877.
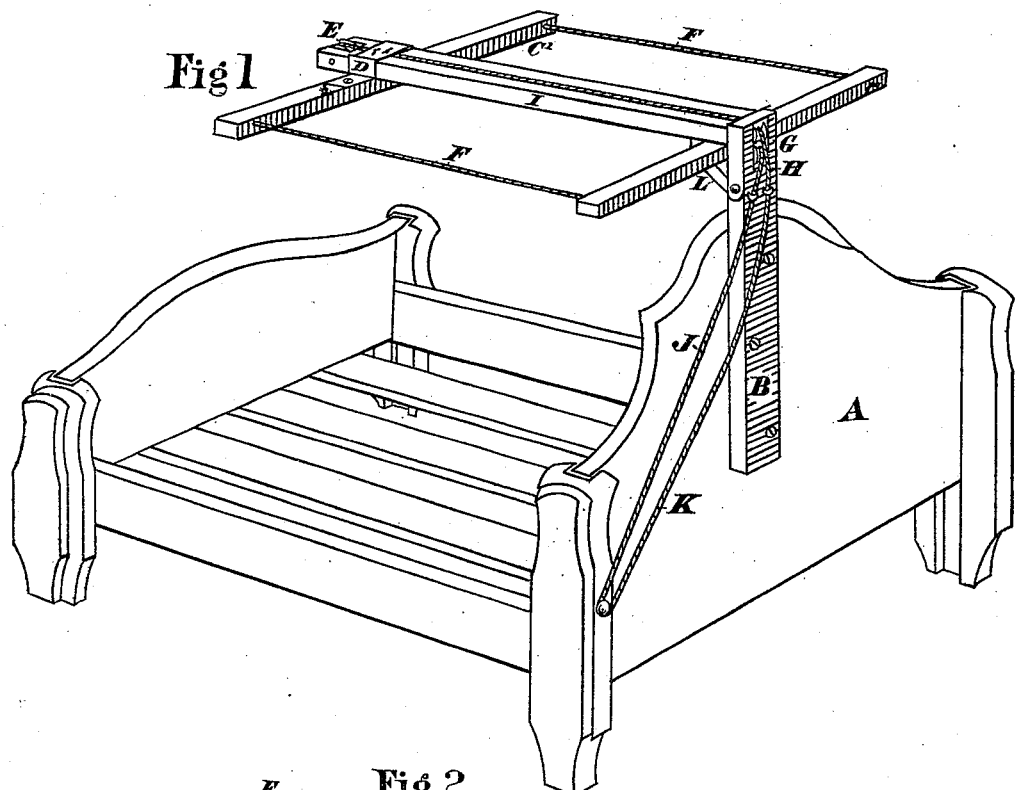
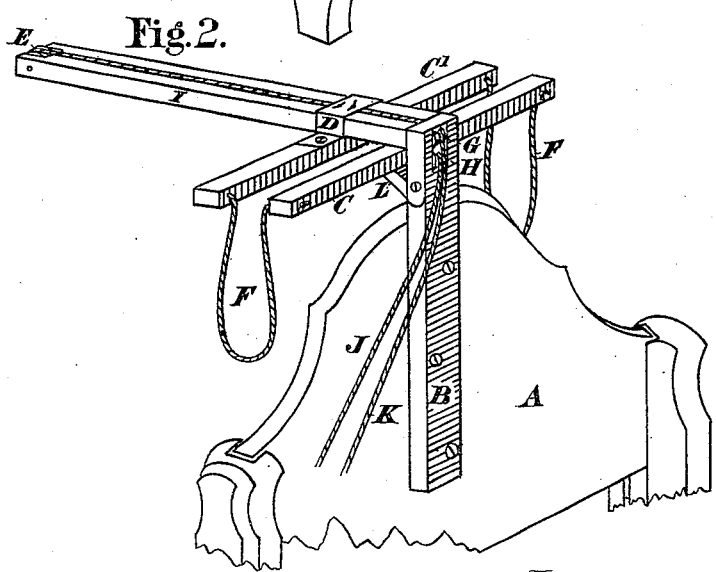
Witnesses.
Frank Pardon,
Albert Fleischmann
Inventor:
George C. Mathers
By A. M. Stout att'y

UNITED STATES PATENT OFFICE.

GEORGE C. MATHERS, OF LOUISVILLE, KENTUCKY.

IMPROVEMENT IN FRAMES FOR MOSQUITO-NETS.

Specification forming part of Letters Patent No. 197,483, dated November 27, 1877; application filed August 24, 1877.

*To all whom it may concern:*

Be it known that I, GEORGE C. MATHERS, of Louisville, county of Jefferson and State of Kentucky, have invented certain Improvements in Frames for Mosquito-Nets, of which the following is a specification:

My invention relates, first, to attaching an upright bar of sufficient length to the headboard of a bedstead, and mounting a grooved pulley in the upper end thereof for a cord to run over; and, secondly, to a horizontal bar, one end of which is rigidly fastened to the said vertical bar and strengthened in position by a brace, and having a grooved pulley mounted in each end of it, and having a groove extending its entire length in both its upper and under sides, suitable for the accommodation of a cord; and, thirdly, to the mounting of two cross-bars just under the horizontal bar, one of which is attached permanently in or near the angle formed by the horizontal and vertical bars, while the other is furnished midway its length with a loop or clip to fit over the horizontal bar, so that the cross-bar may be moved evenly under and along the horizontal bar from one end to the other. The extremities of these cross-bars are attached together by cords of sufficient length to allow the sliding cross-bar to be removed to the free end of the horizontal bar. When the movable cross-bar is in that position it is adapted to hold a mosquito-net of suitable make distended over the bed, all of which will be more fully described hereinafter with reference to the accompanying drawings, in which—

Figure 1 represents a perspective of a bedstead having my improvement attached thereto; Fig. 2, a like view of the same, except that only a part of the bedstead is shown; and Fig. 3, an end view of the free end of the horizontal bar, and the pulley in that end.

A indicates the head-board of a bedstead; B, the vertical bar, and H the pulley mounted therein; I, the horizontal bar, and G and E the pulleys mounted in its extremities; C, the permanent cross-bar; C', the movable one; D, the loop or clip; L, the stiffening-brace; F and F, the cords connecting the outer ends of the cross-bars C and C'; and J K, the endless cord running over pulleys G, H, and E, and in the grooves in the upper and under sides of the horizontal bar I.

I extend my horizontal bar about two-thirds the length of the bed, and have the cross-bars about as long as the bed is wide, and they, with the aid of their cords, hold the net out in good shape when the movable cross-bar C' is moved out as far as it will go, and by means of an endless cord, J K, upon its pulleys and in its grooves, as shown in the drawing, the movable bar C' can be run out or pulled in, at pleasure. When pulled in, it brings the net with it and out of the way. When run out, it distends the net over the bed.

What I claim as my invention, and desire to secure by Letters Patent, is—

1. The vertical bar B, provided with pulley H, and horizontal bar I, having the pulleys G and E in its ends, and endless cord J K, the whole adapted to extend and retract lengthwise the mosquito-net at will, substantially as described.

2. The combination of the vertical bar B, having the pulley H in its top end, and the horizontal bar I, having pulleys G and E mounted in its ends, with the permanent bar C and sliding bar C', the latter provided with loop or stirrup D, and the cords F and J K, adapted to distend the net for use and fold it up when not in use, substantially as described.

GEO. C. MATHERS.

Witnesses:
   A. M. STOUT,
   JEFFERSON BROWN.